United States Patent [19]

Shourek et al.

[11] 3,937,485
[45] Feb. 10, 1976

[54] COLLAPSIBLE LUGGAGE CARRIER

[76] Inventors: Ruth W. Shourek; John Edward Shourek, both of 17520 S. 70th Court, Tinley Park, Ill. 60477

[22] Filed: Aug. 1, 1974

[21] Appl. No.: 493,892

[52] U.S. Cl. ............................... 280/35; 280/36 R
[51] Int. Cl.² .......................................... B62B 3/04
[58] Field of Search........... 280/36 R, 47.17, 47.34, 280/79.1, 79.2, 34 R, 34 B, 35; 190/18 A

[56] References Cited
UNITED STATES PATENTS

| 639,338 | 12/1899 | Barns | 280/36 R |
|---|---|---|---|
| 2,494,199 | 1/1950 | Provitola | 280/36 R |
| 3,007,710 | 11/1961 | Sykes | 280/34 B X |
| 3,400,942 | 9/1968 | Hull | 280/35 |

*Primary Examiner*—M. Henson Wood, Jr.
*Assistant Examiner*—Michael J. Forman

*Attorney, Agent, or Firm*—Merriam, Marshall, Shapiro & Klose

[57] ABSTRACT

A collapsible luggage carrying device is provided having a triangular telescoping back portion and a triangular luggage supporting base section connected thereto. Both the back and the base include elongated tubular frame members diverging from a common apex and being interconnected by a generally transverse connecting and stabilizing bar which maintains the triangular shaped back and base portion in a rigid, expanded position for carrying luggage. The base may also include a plurality of sections telescoped together to thus provide an adjustable length for accommodating several pieces of luggage. The apex of both the upright back portion and the base are interconnected with a flexible strap to provide an enclosed rigid triangular supporting frame surrounding the articles being transported.

8 Claims, 5 Drawing Figures

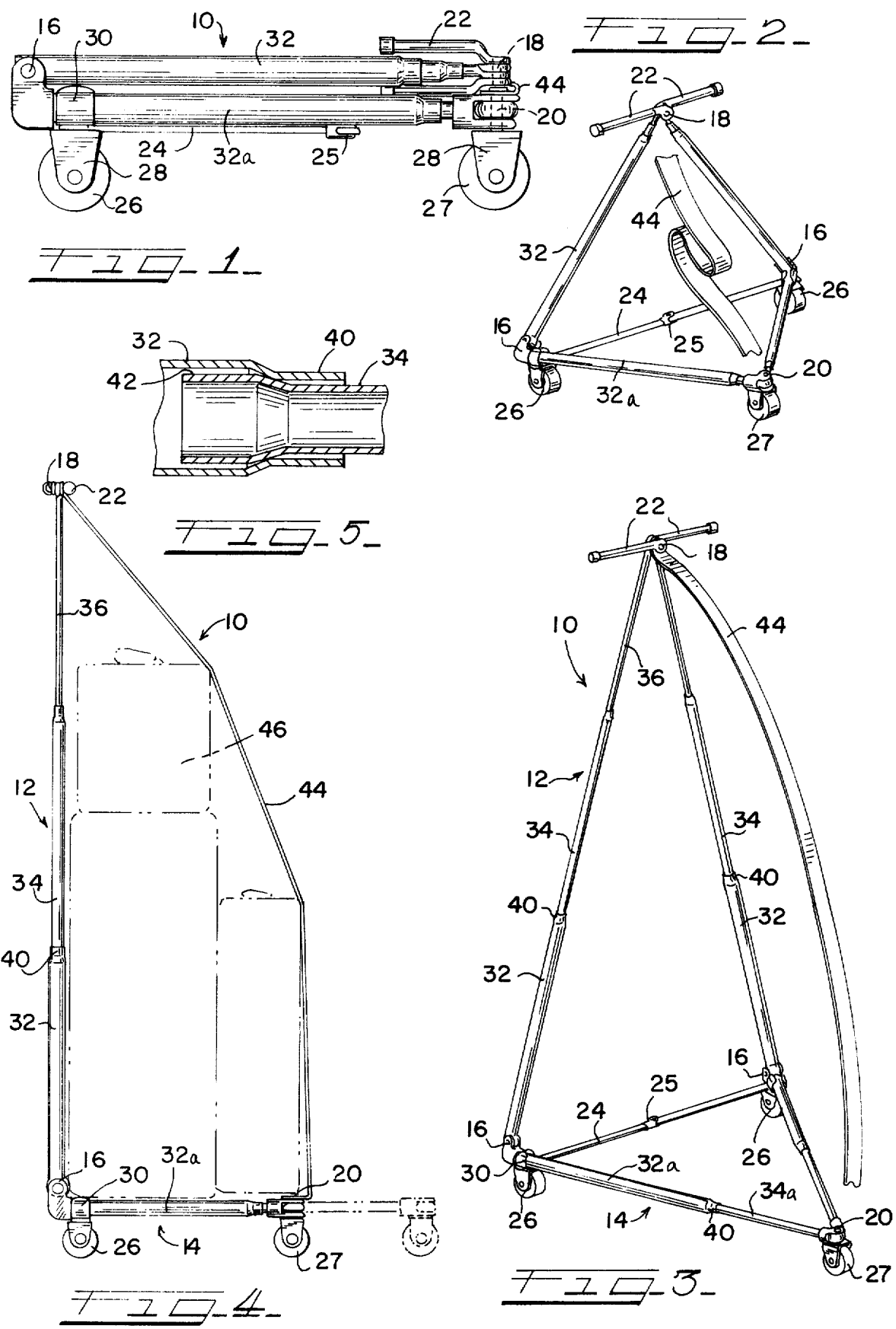

3,937,485

COLLAPSIBLE LUGGAGE CARRIER

BACKGROUND OF THE INVENTION

1. Field of the Invention

This invention pertains to portable luggage carrying devices which may be folded or collapsed into a compact unit.

2. Description of the Prior Art

While some prior art portable luggage carriers such as the Forman, U.S. Pat. No. 2,602,675 (1952) and the Forestier, French Pat. No. 1,509,040 (1966) have provided portable luggage carriers which include telescoping portions which may be collapsed in one direction, there still remains the problem of further reducing the size of the collapsed unit in a second direction. Thus, it has been desirable to provide a luggage carrier which is stable and securely transports luggage and is constructed from frame members which could be fully folded or compacted into a size which could be conveniently carried by hand, in a purse or in a small suitcase or attache case. This invention provides such a luggage carrier.

Portable luggage carriers which may be collapsed for easy transport, such as Kazmark, U.S. Pat. No. 3,612,563 (1971), provide only a single upright which does not adequately support the luggage during transport.

SUMMARY

The nature of this invention deals with a highly portable luggage carrying device made of tubular metal components which are easily collapsed and folded into a portable, lightweight unit which may be easily carried by hand.

In the unfolded, or operative position, the luggage carrier provides a structurally rigid, triangular shaped, upright or back portion with two telescoping side legs or frame members extending from a common connecting point, or apex, which may include a handle for grasping the luggage carrier. The base, which supports the luggage, also has a triangular shape with a pair of side portions diverging from a pivotal connection, or an apex. Each side of the base is connected with an associated leg of the upright back portion. A collapsible cross brace forms a common base for the triangles of both the upright back portion and the base portion. This interconnected triangular geometry of the frame provides an inherently stable luggage carrier.

A flexible strap may be used to interconnect the apex of the triangular base with the apex of the triangular shaped upright. By connecting the back and base in such a manner a rigid triangular support structure encircles the luggage and eliminates the need for high strength hinges, or other reinforcing means, to absorb the cantilever loading which would otherwise occur at the connection of the side frames of the upright back with the legs of the base portion.

To collapse the luggage carrier, the transversely extending brace is collapsed thereby bringing together the bottom of each side frame member. The tubular members are then telescoped, and the base and back folded adjacent one another, thus providing a small, compact, and easily portable luggage carrier.

It is an object of the present invention to provide a lightweight, portable luggage transporting device having telescoping tubular support members and having a collapsible cross brace or strut which permits the unit to be further folded into a compact assembly which may be easily hand carried.

It is another object of the present invention to provide a portable luggage transporting device which may be unfolded to provide a rigid upright back portion and a pivotally connected base portion for the support and transport of luggage, and, the invention also provides a connecting member extending from the top of the upright back portion to the outermost portion of the base and encircling the luggage to thereby provide a reinforced triangle which will rigidly support luggage during transport and add to the inherent lightweight portable feature of the luggage carrying device by eliminating heavy, bulky hinges.

It is another object of the present invention to provide a collapsible luggage carrier having a telescoping upright or back portion pivotally connected to a telescoping base portion thereby providing a luggage carrier having both an adjustable upright section with an adjustable height and a luggage supporting base with an adjustable length.

It is another object of the invention to provide support wheels near the connection of the upright back portion and the attached base portion.

These and other objects of the invention will become apparent from reference to the following description, attached drawings, and appended claims.

BRIEF DESCRIPTION OF THE DRAWINGS

FIG. 1 is a side elevational view of the luggage carrier in the completely collapsed position;

FIG. 2 is a pictorial illustration of the luggage carrier as it appears when initially unfolded from the collapsed position of FIG. 1;

FIG. 3 is a pictorial of the luggage carrying device in the completely unfolded and extended position;

FIG. 4 is a side elevational view of the luggage carrier showing the appearance during transport of luggage and also showing, in phantom, how the base portion may be extended to accommodate several additional articles of luggage; and, FIG. 5 is a partial sectional view showing the swaged connection for interconnecting telescoping tubular members.

DESCRIPTION OF THE PREFERRED EMBODIMENT

Referring now to the drawing and in particular to the pictorial illustration of FIG. 3, it is noticed that the luggage carrier 10 of the present invention combines a triangular shaped upright or back portion 12 with a lower or base portion 14 also having the basic triangular design. Structural advantages are derived from a triangular design which has inherent stability and provides a rigid luggage carrier which does not distort or wobble during movement and which may be easily folded into a convenient package for carrying in a purse or attache case.

A hinge unit 16 pivotally connects each tubular side member of the back 12 with the associated leg of the base 14. The top of the back 12 provides an apex 18 which joins the two sides of the back portion in a pivotal connection. Likewise, the luggage receiving base 14 also includes a pivotal joint or apex 20 which interconnects the leg members of the base. At the apex 18 of the back portion, a pair of handle means 22 may be attached to permit the luggage carrier to be easily grasped. As disclosed in FIG. 1, the handles 22 are sandwiched atop apex 18 in such a manner as to be conveniently foldable into a position adjacent the tubular sides of the back 12 to eliminate an awkward extension which would make transport of the luggage carrier somewhat cumbersome.

The back or upright portion 12 has a pair of tubular side frame members which diverge downwardly and outwardly from the upper apex 18 and terminate at the associated hinge member 16. As noticed in FIGS. 1 and 4, the bottom telescoping tube may be pinned to the hinge unit 16 to form a pivotal connection therewith.

A crossbar or brace 24 interconnects the space ends of the tubular legs of the triangular shaped base. In this manner the crossbar 24 forms a common base or connecting member for the triangles of both the upright or back portion 12 and the associated base portion 14. Any convenient locking arrangement such as that designated by the numeral 25 may be used to maintain the pivotally interconnected portions of the crossbar 24 unfolded so as to insure the luggage carrier will be maintained in a rigid open position for the transport of luggage. The locking member 25 may be a separate tubular member which slips over portions of the crossbar, or, may be an integrally formed recess and dimple type of locking arrangement which is frequently used to lock pivotally interconnected flat metallic members such as those which are used to keep a suitcase or attached case in an open position.

As shown in the drawings, it is anticipated that the luggage carrier will include a plurality of wheels or other type of rollers to permit the carrier to be easily rolled when loaded with luggage. The wheels may include a pair of rear wheels 26 and an associated front wheel 27. As with any wheels or rollers which are used with this invention, there will no doubt be a requirement for an axle and associated bracket supporting arrangement. One type of wheel support is disclosed and indicated by the numeral 28 which will interconnect and support the wheel on the associated tubular frame member. As shown in FIG. 1, located above the wheel supporting member 28 of rear wheels 26 is the end part of crossbar 24 which is sandwiched between the axle support 28 and a frame connecting member 30. The frame connecting member 30 is an auxiliary piece used to provide a reliable, compact connection between a tubular member and the wheel bracket 28.

The upright back triangular portion 12 has side members made up of three telescoping tubular sections 32, 34, 36. The lower tube section 32 has the largest diameter with the intermediate tube 34 and the upper tube 36 having successively smaller diameters. The luggage receiving and supporting base 14 is shown with a pair of tubular, telescoping members 32a and 34a. It is contemplated that the tubular members used in the upright portion could also be used in the base portion thus reducing the number of parts, lowering manufacturing costs, and reducing inventories.

The hinge 16 which interconnects the sides of the upright back portion 12 with the associated legs of the base portion 14 may have a one piece construction as disclosed in the illustrations. The hinge 16 has a horizontally disposed hollow chamber for receiving the tubular leg 32a of the base 14 and also includes, at right angles thereto, a pair of spaced ears for receiving the lower portion of the lower telescoping tube 32 which is connected with a pin to the hinge member 16. It is intended that the upright back 12 be rotatable to an over center, i.e., slightly beyond the vertical position. It is also contemplated that the hinge 16 will be hinged to the tube section 32 in such a manner as to provide a slight interference fit to thereby prevent inadvertent return of the upright back 12 to a horizontal folded position if the luggage carrier is bumped during loading or unloading of luggage. In other words, if the back section 12 is rotated to an intermediate position it will be held by frictional braking of the hinge 16 engaging the lower tubular sections 32. With such a configuration, the tubular member 32, as illustrated in FIG. 1, may be rotated counterclockwise into a generally upright position whereby the tube 32 will bottom out or engage a stop portion of the hinge 16 to thereby prevent further counterclockwise rotation past the vertical stop position. Because of the large force which can be applied to this hinge connection 16, when a number of heavy articles of luggage are placed on the base 10, it is contemplated that this hinge connection could have a safety release to disengage the stop elements of tubes 32 and the associated hinge 16 when an undesirable level of forces is reached which could damage the hinge 16 or tubular frame elements connected thereto. Thus, after back portion 12 is rotated into the upright position as illustrated in FIG. 4 and luggage is placed on the base portion 14, if it is sought to tip the carrier and the strap 44 is not encircling the luggage 46 and thereby interconnecting the upright or back portion 12 with the base portion 14, an automatic release would occur before dangerously high forces would be applied to the hinge connection 16 and the associated tubular members 32 which could result in damage thereto. This release would indicate to the person using the carrier that it is necessary to use the strap because of the high load provided by the luggage.

One other design feature of the carrier is necessitated because of the relatively angular changes which occur as the carrier is expanded from the partially collapsed position of FIG. 2 into the fully expanded position of FIG. 3. As noticed in FIG. 2, the angle between the crossbar 24 and the lower telescoping tube 32 is much smaller than the associated angle between these two members when the carrier is fully expanded as shown in FIG. 3. This angular change must be taken into consideration when selecting a suitable hinge 16. Rotation may be allowed between the hinge 16 and the tube 32a which is inserted into the open end of the hinge 16. Thus, the connection between the hinge 16 and the associated tube 32a is one which will allow relative rotation between the two members while still providing a secure connection between them. In the alternative, if manufacturing procedures find such an attachment objectionable, the hinge 16 may be rigidly and nonrotationally attached to both tubular members 32 and 32a resulting in the side legs of the base 14 undergoing a slight degree of rotation as the upright back 12 is expanded from the collapsed position to the fully expanded position. To accommodate such rotation of the tubular member 32a, the wheel connector 30 would then have to be attached to the tube 32a in a manner as to allow this relative rotation. If such rotation was not provided for, the rear wheels 26 would undergo a slight rotation or canting as the luggage carrier 10 is expanded from the folded to completely open, or operative position.

The connection between each of the tubular sections may be of any convenient form, but, in the interest of reducing the number of manufacturing operations, parts, and providing a low cost reliable luggage carrier, it is anticipated that a swaged connection will be used. This swaged connection, for example, will provide a reduced diameter 40 on the end of tube 32 which is to be slightly larger than the diameter of the body of the tubular member 34. Likewise, to permit the connection to efficiently interconnect the two tubular sections, the end of the tubular member 34 which is received within tube 32 would have a slightly enlarged diameter 42 designed for an interference fit with the reduced diameter 40 of the end of the tube 32 thus to permit the tubes to engage each other and to be held securely. Of course a more elaborate connector could be used such as is commonly found in microphone stands which embody a tubular member having a slotted, tapered, threaded end portion adapted to be sqeezed onto the body of an inserted tubular member when a nut is tightened onto the end of the threaded tube.

Physically, the luggage carrier is intended to be formed from a plurality of interconnected plated, steel tube sections which will have sufficient strength to adequately support 100 pounds of luggage with a built in safety factor. Anodized aluminum alloy or other suitable material could be used.

Dimensionally the luggage carrier will occupy a volume of approximately 4 ×4 ×18 inches in length when folded into the completely collapsed position illustrated in FIG. 1. This compact size will easily permit the luggage carrier to be carried in a carrying case, attache case, or small suitcase. After unfolding the luggage carrier to the position illustrated in FIG. 2, the overall height of the carrier would be approximately 21 inches and the length of the base portion 14 is contemplated as being approximately 12 inches in length. The 12 inch length of the base is provided to thereby accommodate standard size pieces of luggage. Likewise, in the expanded position of FIG. 2, the overall width of the luggage carrier extending across the cross brace 24 is anticipated to be approximately 18 inches. The length and the width of the triangular base is so provided as to easily accept both the standard size and small pieces of luggage. Additionally, the base may also include telescoping tubular members which will provide for extending the base as illustrated in FIG. 4 from a length of 12 inches to approximately 18 inches in length thus permitting additional luggage to be transported.

When the upright, or back portion 12, is fully expanded into the position illustrated in FIGS. 3 and 4, the overall height will be approximately 36 inches as is the height dictated by human engineering factors based on average sizes of anticipated users.

The luggage carrier of this invention is highly compact and transportable because not only do the frame members telescope into shortened lengths but the frame members also fold together to further reduce the size of the unit. This structurally sound unit is intended to have a lengthy useful life due to the reliable, simple design and the ease of folding and unfolding which occurs without causing extreme wear and the complete elimination of both delicate parts and strict adherence to dimensional tolerances. There is no mandatory sequence for folding or unfolding, thus further adding to the ease with which the unit may be utilized.

The features of the triangular design provided in this invention could be used to make a heavier duty carrier by merely increasing the size and strength of the components. Such a heavy duty carrier would be of the hand-truck type and would be very convenient and useful in such a use because of the strength and collapsible features. Of course such a carrier would be somewhat larger than the luggage carrier disclosed herein.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed:

1. A portable luggage carrier comprising:

wheel means;

a frame including both a collapsible triangular upright back section adapted to extend upright, and, an attached triangular base platform portion adapted to extend horizontally and receive luggage for transport;

handle means mounted atop said back section;

hinge means providing for pivotal movement of the back section into a position adjacent to the base portion;

said upright back section including a pair of collapsible leg sections;

pivotal means joining said leg sections and said leg sections constructed to diverge downwardly and outwardly of said pivotal means;

said base portion including a pair of side members and joint means pivotally connecting said sides and said sides constructed to diverge outwardly of each other from said joint means; and, connecting means constructed for positioning and holding both the diverging leg sections of the upright back portion and the diverging side members of the base portion, wherein said luggage carrier is movable from a collapsed position to both a partially extended and fully extended position;

said luggage carrier includes means mounting said wheel means and also includes movement compensating means operatively attached to said carrier to compensate for relative rotation between the leg sections of the upright back section and the side members of the base platform for the transport of luggage when said carrier is in the partially extended and fully extended position.

2. The carrier of claim 1, wherein:

said connecting means includes crossbar means extending between at least one pair of diverging members of the luggage carrier frame;

said crossbar means also comprising a releasable locking member constructed to permit the diverging members to be moved from a diverging, operable position into a generally parallel position.

3. The carrier of claim 1, wherein:

structural reinforcing and luggage restraining strap means are attached to the base portion and to the upright back section for structurally interconnecting said frame members to provide a luggage supporting triangle encircling the transported luggage.

4. The carrier of claim 1, wherein:

said handle means include a movable handle portion which may be folded into a collapsed position.

5. The carrier of claim 1, wherein:

said motion compensating means include connector means for attaching wheels to a portion of the base and having attaching means to permit relative rotation of the side members of the base portion within the attaching means as the luggage carrier is folded and unfolded; and, said crossbar means constructed for positioning and holding the diverging frame members comprises a releasable member extending between the wheels and having means operatively connected to each wheel in such a manner as to prevent rotation of the wheels as the luggage carrier is folded and unfolded, thereby allowing the luggage carrier to be used when the upright back section is in an intermediate, partially collapsed configuration.

6. The carrier of claim 1, and:

said frame members of the upright back section having a plurality of telescoping tubular members and including a lower tubular section connected to said hinge means, an intermediate tubular member of smaller diameter than the lower tubular member and positioned to telescope into the lower tubular member, and, an upper tubular member of smaller diameter than the intermediate tubular member and positioned to telescope into the associated intermediate tubular member; and, each tubular member including at least one cooperating locking portion adapted to join with a locking portion of an associated tubular member when the tubular sections are extended from the collapsed position.

7. The carrier of claim 6, wherein:

each side member of the lower base portion including a first tubular member pivotally attached to the associated hinge means and each side member also including a second tubular member of smaller diameter than the first tubular member and attached to telescope into first tubular member.

8. The carrier of claim 6, wherein:

said lower tubular section of the upright back portion and the first tubular member of the lower base portion having substantially the same length and diameter and thereby being interchangeable to reduce the number of parts required for the luggage carrier; and, said upright back portion and said lower base portion being collapsible by telescoping from a fully extended, operable position into a shortened position and thereafter said crossbar connecting member being collapsible to thereby bring the leg sections of the upright back and sides of the base portion into a collapsible position, and further, said base portion being rotatable into a position adjacent collapsed leg members of the upright portion to thereby completely collapse the luggage carrier for easy, portable transport.

* * * * *